US007783801B2

(12) United States Patent
Lin

(10) Patent No.: US 7,783,801 B2
(45) Date of Patent: Aug. 24, 2010

(54) KVM CONSOLE CABLE AND MULTI-COMPUTER SYSTEM USING THE SAME

(75) Inventor: Li-Ping Lin, Taipei (TW)

(73) Assignee: ATEN International Co., Ltd, Taipei (TW)

( * ) Notice: Subject to any disclaimer, the term of this patent is extended or adjusted under 35 U.S.C. 154(b) by 39 days.

(21) Appl. No.: 11/855,279

(22) Filed: Sep. 14, 2007

(65) Prior Publication Data

US 2009/0077281 A1 Mar. 19, 2009

(51) Int. Cl.
*G06F 3/00* (2006.01)
*G06F 13/00* (2006.01)
*G06F 13/12* (2006.01)

(52) U.S. Cl. .............................. 710/65; 710/63; 710/69; 710/70; 710/71

(58) Field of Classification Search ................... 710/65, 710/63, 69, 70, 71

See application file for complete search history.

(56) References Cited

U.S. PATENT DOCUMENTS

| | | | | |
|---|---|---|---|---|
| 6,609,034 | B1 | 8/2003 | Behrens et al. | |
| 6,671,756 | B1 | 12/2003 | Thomas et al. | |
| 7,035,112 | B2 | 4/2006 | Chen | |
| 2002/0084988 | A1 | 7/2002 | Kuo | |
| 2003/0188049 | A1 | 10/2003 | Dickens | |
| 2004/0088468 | A1 | 5/2004 | Hasegawa | |
| 2005/0066000 | A1 | 3/2005 | Liaw et al. | |
| 2005/0138245 | A1 | 6/2005 | Chen | |
| 2007/0128920 | A1* | 6/2007 | Brown et al. | 439/440 |
| 2008/0030947 | A1* | 2/2008 | Behrens et al. | 361/686 |
| 2008/0147922 | A1* | 6/2008 | Chou | 710/62 |

* cited by examiner

*Primary Examiner*—Niketa I Patel
(74) *Attorney, Agent, or Firm*—Patterson & Sheridan, LLP; Keith P. Taboada

(57) ABSTRACT

The invention provides KVM console cables, comprising a video connector, a first console connector, a second console connector, a third console connector, a combined connector, and a transmission line. The video connector is utilized to connect to a video monitor. The first, second, and third console connectors are utilized to connect to a first console device, a second console device and third console device, respectively. The combined connector is utilized to connect to a KVM switch. The video connector and the first, second and third console connectors are connected to the combined connector by the transmission line.

23 Claims, 4 Drawing Sheets

KVM CONSOLE CABLE AND MULTI-COMPUTER SYSTEM USING THE SAME

BACKGROUND OF THE INVENTION

1. Field of the Invention

The invention relates to KVM console cables and multi-computer systems using the KVM console cable, wherein the KVM console cable connects devices of a console to a KVM switch.

2. Description of the Related Art

A KVM switch (with KVM being an abbreviation for Keyboard, Video, and Mouse) is a hardware device that allows a user to control multiple computers from a single keyboard, video monitor and mouse. The keyboard, video monitor and mouse form a console. In conventional techniques, the keyboard, video monitor and mouse are separately connected to the KVM switch via three separate KVM console cables, and the conventional KVM switch comprises three separate KVM console connectors for connecting the three separate KVM console cables. The separately designed KVM console connectors occupy a large area of the KVM switch, and set-up is complicated by the large amount of KVM console cables making the user confused about how to connect the KVM console cables to the KVM switch.

BRIEF SUMMARY OF THE INVENTION

To reduce the size of the KVM switch and to avoid confusion when connecting the KVM console cables, a novel KVM console cable and related multi-computer system are called for.

The invention provides a KVM console cable, comprising a video connector, a first console connector, a second console connector, a third console connector, a combined connector, and a transmission line. The video connector is utilized to connect to a video monitor. The first, second, and third console connectors are utilized to connect to a first console device, a second console device and third console device, respectively. The combined connector is utilized to connect to the KVM switch. The video connector and the first, second and third console connectors are connected to the combined connector by the transmission line.

The invention further discloses a multi-computer system, comprising a console, a KVM switch, and a KVM console cable. The KVM switch comprises a KVM console connector. The console comprises a video monitor, a first console device, a second console device, and a third console device. The KVM console cable comprises a video connector, a first console connector, a second console connector, a third console connector, a combined connector, and a transmission line. The video connector is utilized to connect to the video monitor. The first, second and third console connectors are utilized to connect to the first, second and third console devices, respectively. The combined connector is utilized to connect to the KVM console connector. The video connector and the first, second and third console connectors are connected to the combined connector via the transmission line.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
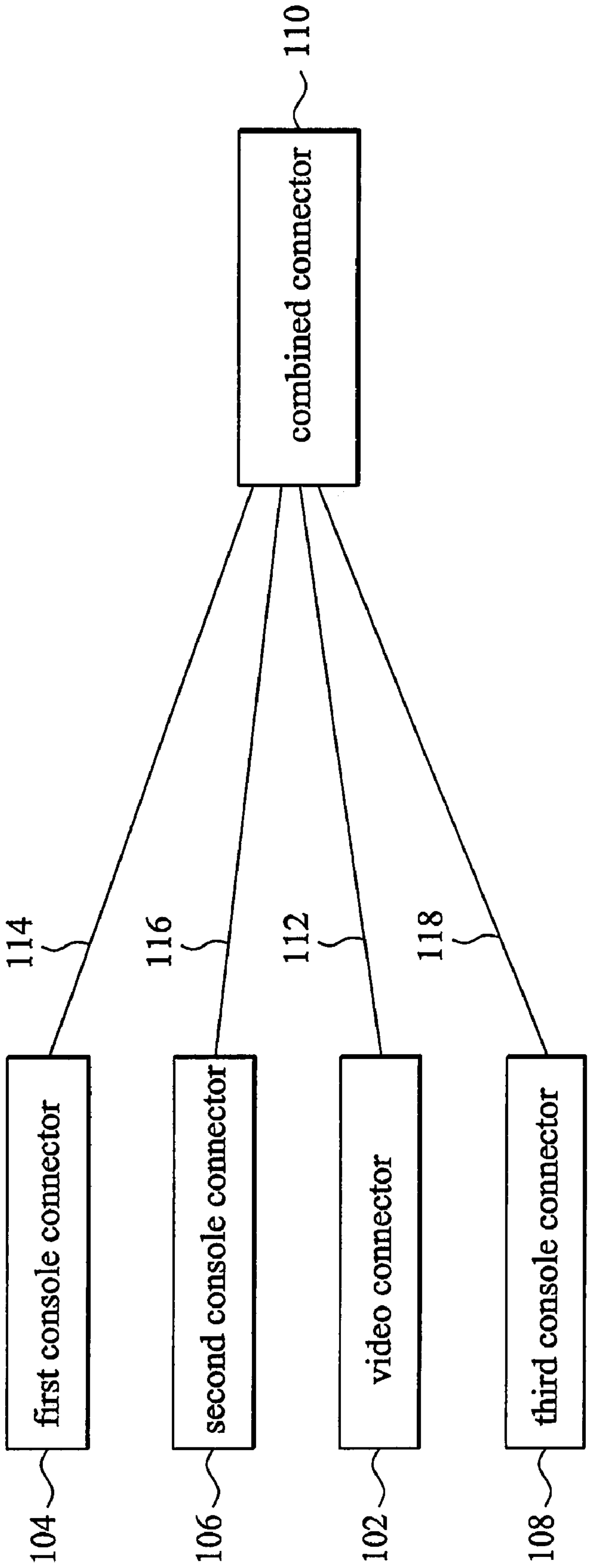
FIG. 1 shows an embodiment of the KVM console cable of the invention.

FIG. 1 shows a block diagram of an embodiment of the KVM console cable of the invention. The KVM console cable comprises a video connector 102, a first console connector 104, a second console connector 106, a third console connector 108, a combined connector 110, and a transmission line comprising a plurality of sub-transmission lines 112, 114, 116 and 118. The video connector 102 is utilized to connect to a video monitor of a console (not shown). The first, second and third console connectors (104, 106 and 108) are utilized to connect to a first console device of the console (not shown), a second consoled device (not shown) and a third console device of the console (not shown), respectively. The combined connector 110 is utilized to connect to a KVM console connector of a KVM switch. The transmission line (comprising the sub-transmission lines 112-118) connects the video connector 102, the first, second and third console connectors (104-108) to the combined connector 110. Although FIG. 1 illustrates the sub-transmission lines (112-118) separately for convenience, the sub-transmission lines 112, 114, 116 and 118 are bound together as one cable in practical use. In one embodiment, the first, second and third console connectors (104, 106 and 108) are female connectors. The video connector 102 is a female connector. The combined connector 110 is a female connector.

In some embodiments, the video connector 102 may be a VGA (Video Graphics Array) connector or a DVI (Digital Visual Interface) connector. When the video connector 102 is a VGA connector, the combined connector 110 comprises a plurality of VGA pins corresponding to the VGA connector (102). The arrangement of the VGA pins of the combined connector 110 is identical to the arrangement of the pins of the VGA connector (102).

The first and second console connectors 104 and 106 use the same interface standard while the third console connector 108 uses an interface standard different from the interface standard of the first and second console connectors 104 and 106.

In some embodiments, the first console connector 104 may be a USB keyboard connector for connecting to a USB keyboard, the second console connector 106 may be a USB mouse connector for connecting to a USB mouse, and the third console connector 108 may be a PS/2 keyboard connector or a PS/2 mouse connector for connecting to a PS/2 keyboard or a PS/2 mouse.

In some embodiments, the first console connector 104 may be a PS/2 keyboard connector for connecting to a PS/2 keyboard, the second console connector 106 may be a PS/2 mouse connector for connecting to a PS/2 mouse, and the third console connector 108 may be a USB keyboard connector or a USB mouse connector for connecting to a USB keyboard or a USB mouse.

Figure 2:
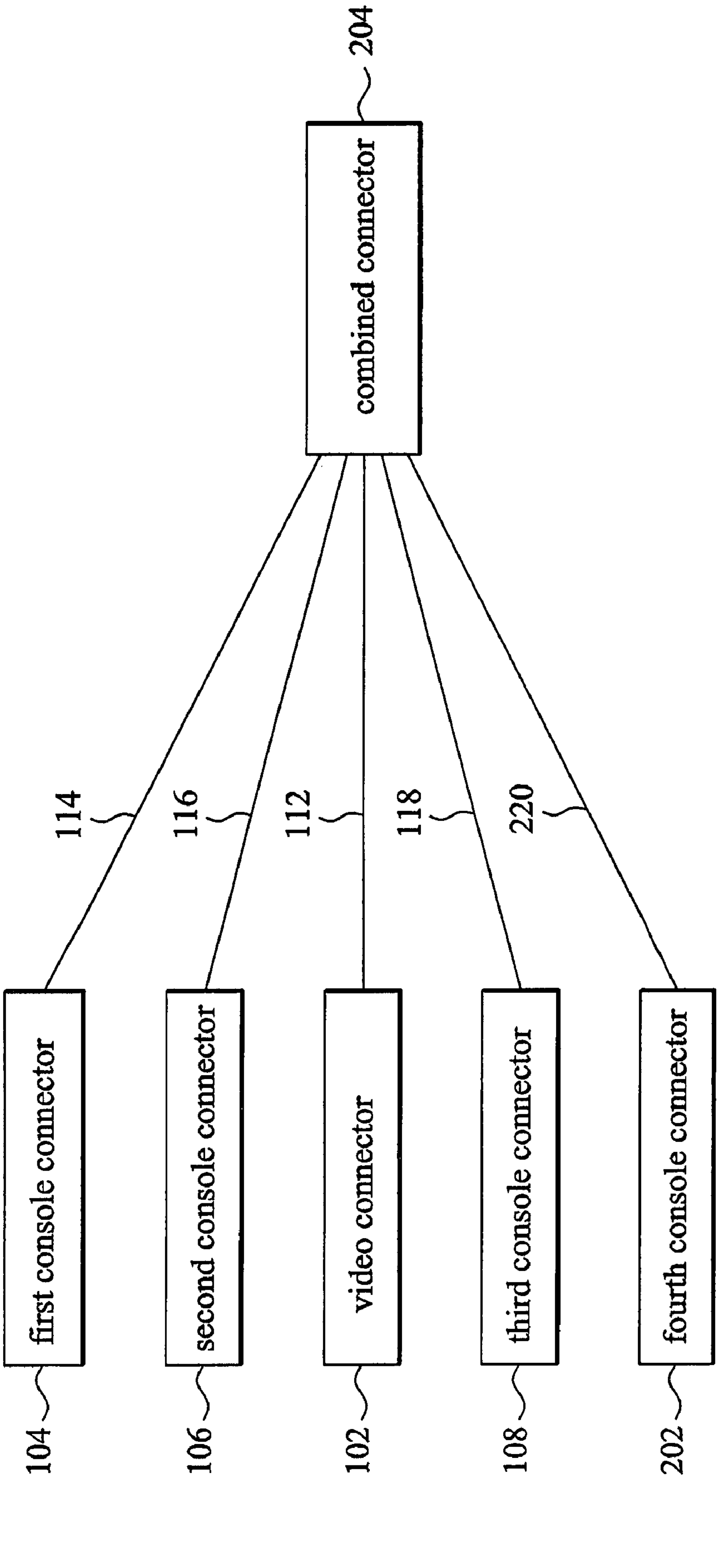
FIG. 2 shows another embodiment of the KVM console cable of the invention.

FIG. 2 shows the block diagram of another embodiment of the KVM console cable. Compared to the KVM console cable shown in FIG. 1, the KVM console cable shown in FIG. 2 further comprises a fourth console connector 202 utilized to connect a fourth console device (not shown). The fourth console connector 202 uses the same interface standard as the third console connector 108 uses. In such cases, the first console connector 104 may be a USB keyboard connector for connecting to a USB keyboard, the second console connector 106 may be a USB mouse connector for connecting to a USB mouse, the third console connector 108 may be a PS/2 keyboard connector for connecting to a PS/2 keyboard, and the fourth console connector 202 may be a PS/2 mouse connector for connecting to a PS/2 mouse. The combined connector 204 comprises a USB voltage source pin corresponding to voltage source pins of the USB keyboard connector (104) and the USB mouse connector (106). The combined connector 204 comprises a PS/2 voltage source pin corresponding to voltage source pins of the PS/2 keyboard connector (108) and the PS/2 mouse connector (202). The combined connector 204 connects to the fourth console device via a sub-transmission line 220 in the transmission line. In some embodiments, the fourth connector 202 is a female connector.

Figure 3:
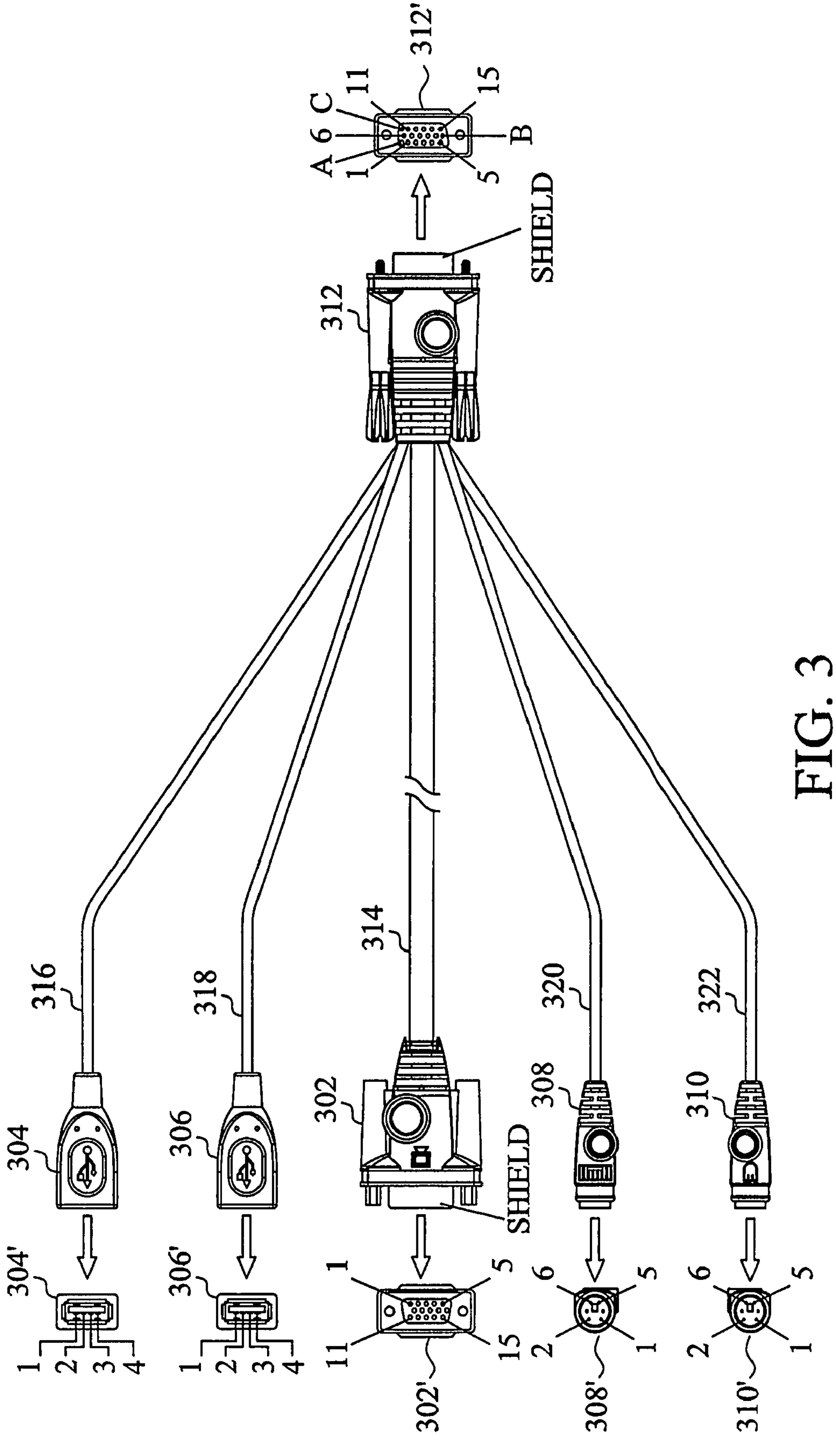
FIG. 3 shows another embodiment of the KVM console cable of the invention.

FIG. 3 shows an embodiment of the KVM console cable. The console cable comprises a VGA connector 302, a USB keyboard connector 304, a USB mouse connector 306, a PS/2 keyboard connector 308, a PS/2 mouse connector 310, a combined connector 312, and a transmission line comprising a plurality of sub-transmission lines 314-322. The arrangement of the pins of the connectors 302-312 are shown in 302'-312', respectively. In one embodiment, the shape of the plug of the combined connector 312 is specially designed. Referring to the diagram 312', a narrow side of the plug is perpendicular to a wide side of the plug. In another embodiment, two opposite narrow sides of the plug are inclined to a wide side of the combined connector 312.

TABLE 1 shows the pins of each connector (302-312). As shown in TABLE 1, the combined connector 312 comprises 18 pins (numbered 1-15 and A-C) and a shield ground (abbreviated as SHIELD), the VGA connector 302 comprises 15 pins (numbered 1-15), the USB keyboard connector 304 comprises 4 pins (numbered 1-4), the USB mouse connector 306 comprises 4 pins (numbered 1-4), the PS/2 keyboard connector 308 comprises 4 pins (numbered 1-4), and the PS/2 mouse connector 310 comprises 4 pins (numbered 1-4).

The combined connector 312 comprises a plurality of VGA pins (1-3, 6, 12-15, and SHIELD) corresponding to the pins of the VGA connector 302. The arrangement of the VGA pins of the combined connector (pins 1-3, 6, 12-15, and SHIELD of the combined connector 312) is identical to the arrangement of the pins of the VGA connector (pins 1-15 of the VGA connector 302). With the arrangement of the VGA pins of the combined connector 312, the KVM switch will not be destroyed when the user incorrectly plugs a VGA device into the port for the combined connector 312.

To reduce the size of the combined connector 312, voltage source pins of the USB keyboard connector and the USB mouse connector (pin 1 of the USB keyboard connector 304 and pin 1 of the USB mouse connector 306) share one pin of the combined connector 312 (pin 7 of the combined connector 312, named USB_KMVCC), and voltage source pins of the PS/2 keyboard connector and the PS/2 mouse connector (pin 1 of the PS/2 keyboard connector 308 and pin 1 of the PS/2 mouse connector 310) share one pin of the combined connector 312 (pin 9 of the combined connector 312, named PS2_KMVCC).

Figure 4:
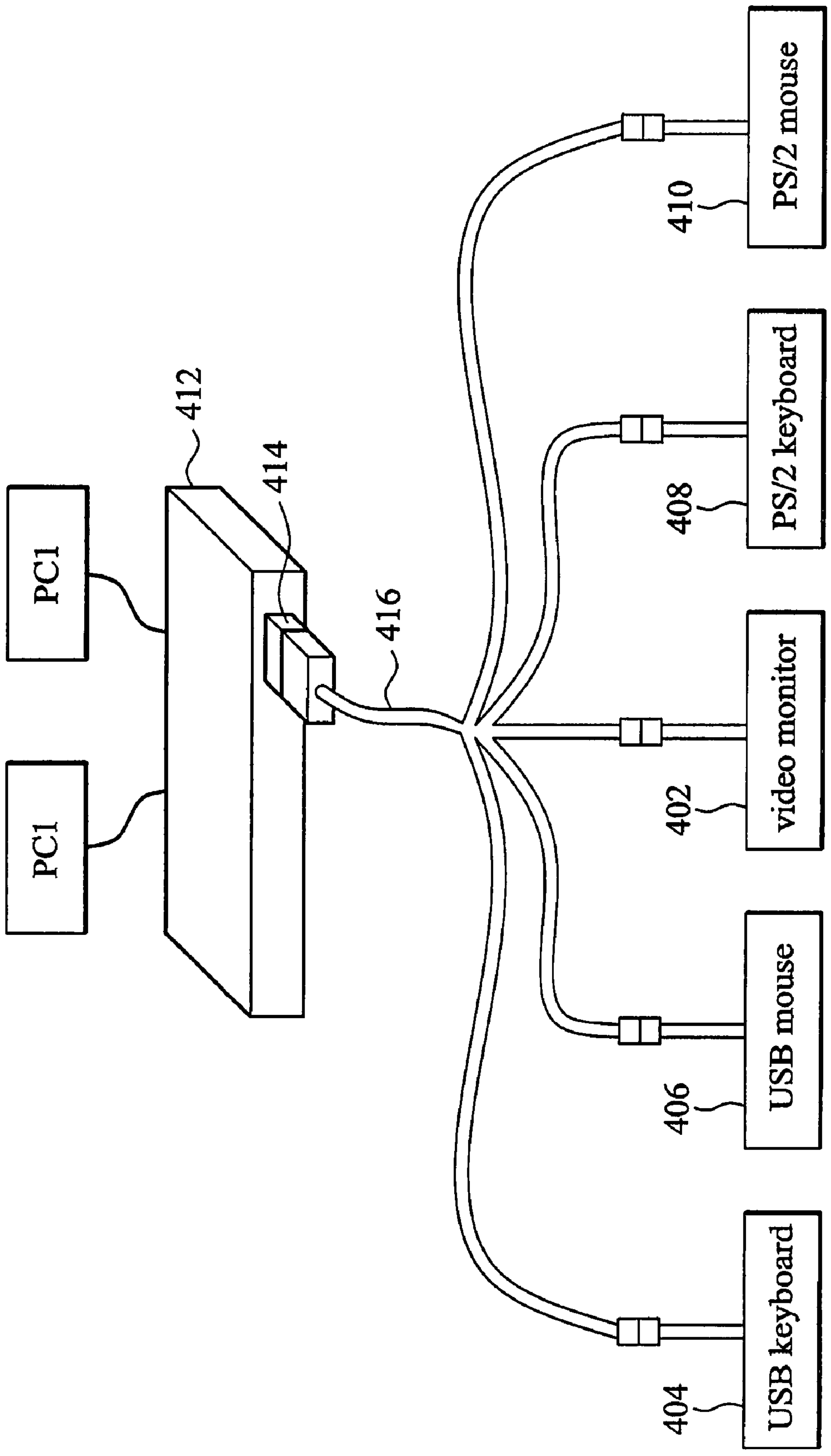
FIG. 4 shows an embodiment of the multi-computer system of the invention.

The invention further discloses a multi-computer system comprising a KVM switch 412 comprising a KVM console connector 414, and a KVM console cable of the invention. FIG. 4 shows an embodiment of the multi-computer system. The console comprises a video monitor 402, a USB keyboard 404, a USB mouse 406, a PS/2 keyboard 408, and a PS/2 mouse 410, which are connected to a KVM switch 412 by a KVM console cable shown in FIG. 3 (component 416 of FIG. 4). A user can control computers PC1 or PC2 by the devices of the console (402-410). The video monitor 402, USB keyboard 404, USB mouse 406, PS/2 keyboard 408, and PS/2

TABLE 1

| Combined Connector (312) | VGA Connector (302) | USB Keyboard Connector (304) | USB Mouse Connector (306) | PS/2 Keyboard Connector (308) | PS/2 Mouse Connector (310) |
|---|---|---|---|---|---|
| 1. R | 1. R | | | | |
| 2. G | 2. G | | | | |
| 3. B | 3. B | | | | |
| 4. KB_D− | | 2. KB_D− | | | |
| 5. KB_D+ | | 3. KB_D+ | | | |
| 6. AGND | 6, 7, 8. AGND | | | | |
| 7. USB_KMVCC | | 1. USB_KMVCC | 1. USB_KMVCC | | |
| 8. MS_D− | | | 2. MS_D− | | |
| 9. PS2_KMVCC | | | | 1. PS2_KMVCC | 1. PS2_KMVCC |
| 10. KD | | | | 2. KD | |
| 11. MS_D+ | | | 3. MS_D+ | | |
| 12. ID1 | 12. ID1 | | | | |
| 13. H | 13. H | | | | |
| 14. V | 14. V | | | | |
| 15. ID3 | 15. ID3 | | | | |
| A. MD | | | | | 2. MD |
| B. KC | | | | 3. KC | |
| C. MC | | | | | 3. MC |
| SHIELD | 5, 10. SHIELD | 4. SHIELD | 4. SHIELD | 4. SHIELD | 4. SHIELD |

mouse 410 are connected to the connectors of the KVM console cable 416. The KVM console connector 414 is connected to the combined connector of the KVM console cable 416. The KVM switch 412 is connected to a plurality of computers, such as PC1 and PC2.

While the invention has been described by way of example and in terms of embodiments, it is to be understood that the invention is not limited thereto. To the contrary, it is intended to cover various modifications and similar arrangements (as would be apparent to those skilled in the Art). Therefore, the scope of the appended claims should be accorded to the broadest interpretation so as to encompass all such modifications and similar arrangements.

What is claimed is:

1. A Keyboard Video Monitor (KVM) console cable, comprising:

a video connector, having one end connecting to a video monitor of a console;

a first console connector, having one end connecting to a first console device of the console, wherein the first console connector is a first Universal Serial Bus (USB) connector;

a second console connector, having one end connecting to a second console device of the console, wherein the second console connector is a second USB connector;

a third console connector, having one end connecting to a third console device of the console, wherein the third console connector is a Personal System/2 (PS/2) connector, wherein the first, second and third console connectors are female connectors;

a combined connector, connecting to a KVM switch; and a transmission line, connecting the other end of the video connector, the other end of the first console connector, the other end of the second console connector and the other end of the third console connector to the combined connector.

2. The KVM console cable of claim 1, wherein the first console connector is a USB keyboard connector, the second console connector is a USB mouse connector, and the third console connector is a PS/2 keyboard connector or a PS/2 mouse connector.

3. The KVM console cable of claim 1, further comprising a fourth console connector connecting to a fourth console device.

4. The KVM console cable of claim 3, wherein the first console connector is a USB keyboard connector, the second console connector is a USB mouse connector, the third console connector is a PS/2 keyboard connector, and the fourth console connector is a PS/2 mouse connector.

5. The KVM console cable of claim 4, wherein the combined connector comprises a USB voltage source pin corresponding to voltage source pins of the USB keyboard connector and the USB mouse connector.

6. The KVM console cable of claim 4, wherein the combined connector comprises a PS/2 voltage source pin corresponding to voltage source pins of the PS?2 keyboard connector and the PS/2 mouse connector.

7. The KVM console cable of claim 1, wherein the video connector is a Video Graphics Array (VGA) connector.

8. The KVM console cable of claim 7, wherein the combined connector comprises a plurality of VGA pins corresponding to the VGA connector, and the arrangement of the VGA pins is identical to the arrangement of the pins of the VGA connector.

9. The KVM console cable of claim 1, wherein the combined connector includes 18 pins.

10. The KVM console cable of claim 1, wherein the first and the second console connectors use the same interface standard and the third console connector uses an interface standard different from the interface standard of the first and the second console connectors.

11. The KVM console cable of claim 10, further comprising a fourth console connector connecting to a fourth console device.

12. The KVM console cable of claim 11, wherein the third and fourth console connectors use the same interface standard.

13. A multi-computer system, comprising:

a Keyboard Video Monitor (KVM) switch, comprising a KVM console connector, connecting to a plurality of computers; and a KVM console cable, comprising:

a video connector, having one end connecting to a video monitor of a console;

a first console connector, having one end connecting to a first console device of the console, wherein the first console connector is a first Universal Serial Bus (USB) connector;

a second console connector, having one end connecting to a second console device of the console, wherein the second console connector is a second USB connector;

a third console connector, having one end connecting to a third console device of the console, wherein the third console connector is a Personal System/2 (PS/2) connector, wherein the first, second and third console connectors are female connectors;

a combined connector, connecting to the KVM console connector; and a transmission line, connecting the other end of the video connector, the other end of the first console connector, the other end of the second console connector and the other end of the third console connectors to the combined connector.

14. The multi-computer system of claim 13, wherein the first console connector is a USB keyboard connector, the second console connector is a USB mouse connector, and the third console connector is a PS/2 keyboard connector or a PS/2 mouse connector.

15. The multi-computer system of claim 13, wherein the KVM console cable further comprises a fourth console connector connecting to a fourth console device.

16. The multi-computer system of claim 15, wherein the first console connector is a USB keyboard connector, the second console connector is a USB mouse connector, the third console connector is a PS/2 keyboard connector, and the fourth console connector is a PS/2 mouse connector.

17. The multi-computer system of claim 15, wherein the combined connector comprises a USB voltage source pin corresponding to voltage source pins of the USB keyboard connector and the USB mouse connector.

18. The multi-computer system of claim 15, wherein the combined connector comprises a PS/2 voltage source pin corresponding to voltage source pins of the PS/2 keyboard connector and the PS/2 mouse connector.

19. The multi-computer system of claim 13, wherein the video connector is a Video Graphics Array (VGA) connector.

20. The multi-computer system of claim 19, wherein the combined connector comprises a plurality of VGA pins corresponding to the VGA connector, and the arrangement of the VGA pins is identical to the arrangement of the pins of the VGA connector.

21. The multi-computer system of claim 13, wherein the combined connector includes 18 pins.

22. The multi-computer system of claim 21, wherein the first and second console connectors use the same interface standard and the third console connector uses an interface standard different from the interface standard of the first and second console connectors.

23. The multi-computer system of claim 22, wherein the KVM console cable further comprises a fourth console connector connecting to a fourth console device, the third and fourth console connectors use the same interface standard.

* * * * *